United States Patent
Saha et al.

(10) Patent No.: US 7,406,481 B2
(45) Date of Patent: Jul. 29, 2008

(54) USING DIRECT MEMORY ACCESS FOR PERFORMING DATABASE OPERATIONS BETWEEN TWO OR MORE MACHINES

(75) Inventors: Debashis Saha, Foster City, CA (US); John Ciminski, Redwood City, CA (US); Debashish Chatterjee, Fremont, CA (US); Lakshminarayan Chidambaran, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 461 days.

(21) Appl. No.: 10/323,561

(22) Filed: Dec. 17, 2002

(65) Prior Publication Data

US 2004/0117375 A1    Jun. 17, 2004

(51) Int. Cl.
*G06F 7/00* (2006.01)

(52) U.S. Cl. .............. 707/104.1; 707/1; 707/2; 707/10

(58) Field of Classification Search ........... 707/1–104.1
See application file for complete search history.

(56) References Cited

U.S. PATENT DOCUMENTS

| | | | | |
|---|---|---|---|---|
| 5,261,083 A | * | 11/1993 | Witkowski et al. | 714/48 |
| 5,485,579 A | * | 1/1996 | Hitz et al. | 709/221 |
| 5,835,733 A | * | 11/1998 | Walsh et al. | 710/303 |
| 5,968,115 A | * | 10/1999 | Trout | 718/107 |
| 6,065,037 A | * | 5/2000 | Hitz et al. | 709/200 |
| 6,075,938 A | * | 6/2000 | Bugnion et al. | 703/27 |
| 6,112,304 A | * | 8/2000 | Clawson | 713/156 |
| 6,178,533 B1 | * | 1/2001 | Chang | 714/739 |
| 6,317,119 B1 | * | 11/2001 | Wakeland et al. | 345/161 |
| 6,560,641 B1 | * | 5/2003 | Powderly et al. | 709/219 |
| 6,909,708 B1 | * | 6/2005 | Krishnaswamy et al. | 370/352 |
| 6,985,956 B2 | * | 1/2006 | Luke et al. | 709/229 |
| 2001/0037406 A1 | * | 11/2001 | Philbrick et al. | 709/250 |
| 2002/0026502 A1 | * | 2/2002 | Phillips et al. | 709/219 |
| 2002/0064149 A1 | * | 5/2002 | Elliott et al. | 370/352 |
| 2002/0091844 A1 | * | 7/2002 | Craft et al. | 709/230 |
| 2003/0018702 A1 | * | 1/2003 | Broughton et al. | 709/202 |
| 2004/0039775 A1 | * | 2/2004 | Yoshida et al. | 709/203 |
| 2004/0064590 A1 | * | 4/2004 | Starr et al. | 709/250 |
| 2004/0117368 A1 | | 6/2004 | Saha et al. | 707/6 |

OTHER PUBLICATIONS

Zhou et al., "Expriences with VI communication for database storage", 2002, IEEE, pp. 257-268.*
International Searching Authority, "Notification of Transmittal of the International Search Report or the Declaration," PCT/US03/39555, dated Aug. 16, 2005, 6 pages.

(Continued)

*Primary Examiner*—don wong
*Assistant Examiner*—Linh Black
(74) *Attorney, Agent, or Firm*—Hickman Palermo Truong & Becker LLP

(57) ABSTRACT

Direct memory accessed is used to perform database operations between two or more machines. A first segment of memory is allocated for a second machine, where at least one of the first machine and second machine is a database server. During performance of a database operation that involves the transfer of data from the second machine to the first machine, data in the first segment of memory is buffered in response to the second machine writing the data to a second segment of memory on the second machine.

68 Claims, 6 Drawing Sheets

OTHER PUBLICATIONS

Current Claims, PCT/US03/39555, 8 pages.
Dell Computer Corporation, "Infiniband Architecture: Next-Generation Server I/O," White Paper, Oct. 2000, XP-02242048, pp. 1-10.
Jang, SAQIB, "'Beyond Gigabit' Networking and Next-Generation Network-System I/O Standards. Comparative Positioning of Infiniband and RDMA over TCP," A Margalla Communications Special Report, Nov. 2002 , XP-002334409, pp. 1-17.
Sapuntzakis, C. et al., "The Case for RDMA," Internet Draft, Dec. 2000. XP-002961878, pp. 1-12.
Scott, Heidi et al., "A Study of the Impact of Direct Access I/O on Relational Database Management Systems," Proceedings of the 2002 Conference of the Centre for Advanced Studies on Collaborative Research, Sep. 30, 2002, XP-002330541, pp. 1-10.
Zhou, Yuanyuan et al., "Experiences with VI Communication for Database Storage," Proceeding of the 29th International Symposium on Computer Architecture, Anchorage AL, May 25-29, 2002, XP-001110063, pp. 257-268.
Jeff Silberman, et al., "User-Mode I/O in Oracle 10G with ODM and DAFS," undated, Paper #36777, http://otn.oracle.com/deploy/availability/pdf/ow_user-mode_doc.pdf, 12 pages.
Sharonn, "Chapter 5: Direct Memory Access," Jun. 24, 1997, http://webclass.cqu.edu.au//Units/81120_FOCT_Hardware/Study_Material/Study_Guide/chap5/, 6 pages.
Raja Srinivasan, Oracle Corporation, "Achieving Mainframe-Class Performance on Intel Servers Using InfiniBand Building Blocks," an Oracle White Paper, Apr.2003, http://otn.oracle.com/deploy/availability/pdf/oracle_IB.pdf, 10 pages.
International Searching Authority, "Written Opinion," PCT/US03/39555, dated Aug. 26, 2005, 9 pages.
Current Claims, PCT/US03/39555, 8 pages.
European Patent Office, "Communication Pursuant to Article 96(2) EPC," App. No. 03814733.6, 5 pgs.
Current Claims, App. No. 03814733.6, 8 pages.
International Preliminary Examining Authority, "Notification of Transmittal of the International Preliminary Examination Report," PCT/US03/39555, 11 pages.
Current Claims, PCT/US03/39555, 10 pages.
Clean Version of Claims, application No. 200380106101.7, 11 pages.
State Intellectual Property Office of P.R.C., "Notification of The First Office Action", application No. 200380106101.7, dated Apr. 6, 2007, 12 pages.
Dell, "Infiniband Architecture: Next-Generation Server I/O", XP-002242048, White Paper, dated Oct. 2000, 10 pages.
Jang, Saqib, "Beyond Gigabit Networking and Next-Generation Network-System I/O Standards, Comparative Positioning of InfiniBand and RDMA or TCP", XP-002334409, A Margalla Communications Special Report, dated Nov. 2002, 17 pages.
Scott, Heidi, et al., "A Study of the Impact of Direct Access I/O on Relational Database Management Systems", XP-002330541, Proceedings of the 2002 Conference of the Center For Advanced Studies on Collaborative Research, published Sep. 30, 2002, 10 pages.
ZHou, YuanYuan, et al., "Experiences with VI Communication for Database Storage", XP-001110063, Proceedings of the 29th Annual International Symposium on Computer Architecture (ISCA 2002), published May 25, 2002, pp. 257-268.
Claims, European application No. 200380106101.7, 10 pages.
The State Intellectual Property Office of P.R.C., "Notification of The Second Office Action", European application No. 200380106101.7, dated Sep. 14, 2007, 9 pages.

* cited by examiner

USING DIRECT MEMORY ACCESS FOR PERFORMING DATABASE OPERATIONS BETWEEN TWO OR MORE MACHINES

FIELD OF THE INVENTION

The present invention relates to communications in a database system environment. In particular, the present invention relates to using direct memory access for performing database operations between two or more machines.

BACKGROUND OF THE INVENTION

Direct Memory Access (DMA) is a technique for transferring data from one memory segment to another memory segment without passing the data through a central processing unit. Computers that have DMA enabled channels can transfer data to and from devices much more quickly that computers that use more traditional Internet Protocol channels.

DMA technology has increasingly been incorporated into different high-speed transfer protocols and architectures. Examples of architectures that use DMA as a feature include VIRTUAL INTERFACE, and INFINIBAND. The DMA feature in such systems enable data in a memory on one device to specifically be targeted for memory on another external location, such as on another node or computer system. To gain full advantage of DMA, systems that incorporate DMA features do so with fast network connect devices.

DMA data transfers remove data bit overhead that is characteristic of the Transmission Control Protocol/Internet Protocol (TCP/IP) data transfers. TCP/IP protocol transfers use byte streams that are segmented, where each segment includes header information and other characteristics to enable that particular data segment to reach its intended target. In contrast, DMA transfers data in a memory segment without segmenting the data into individually deliverable bytes. While DMA provides a favorable contrast to TCP/IP, techniques also exist to use DMA with TCP/IP. One such technique is referred to as remote DMA (RDMA) over TCP/IP.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
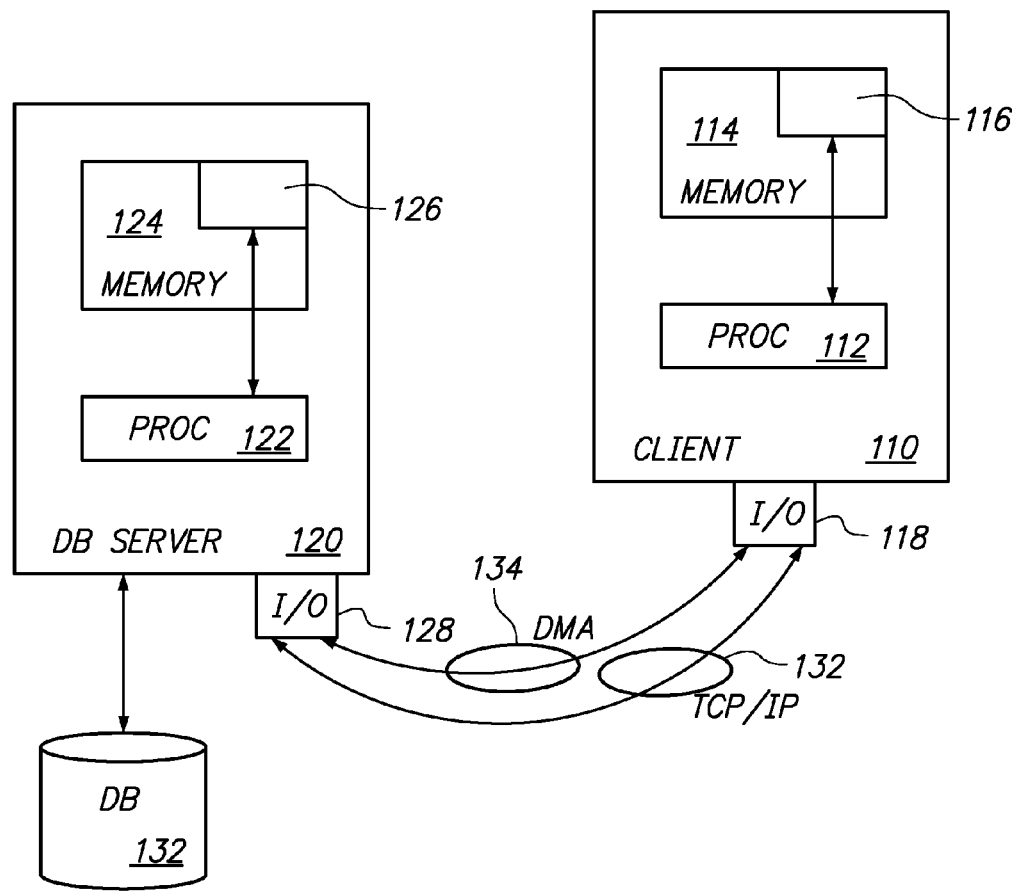
FIG. 1 illustrates a basic system for transferring data between two machines, under an embodiment of the invention.

A method and apparatus for using direct memory access for performing database operations between two or more machines is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Embodiments of the invention enable direct memory access (DMA) technology to be effectively implemented in a database system environment. In particular, database operations conducted with a database server may be performed using a DMA communication medium. A DMA communication medium includes a channel that enables two computers to share memory with each other in a manner that is transparent on the respective computers. Thus, if one computer writes data to a memory that is subject to a DMA channel, that data is transferred to the other computer with minimal intervention from the processor. The use of a DMA communication medium to perform database operations, particularly those involving the transfer of large amounts of data, enable the database operations to be performed significantly more quickly than through use of more traditional communication mediums, such as TCP/IP.

According to one embodiment, database operations may be performed on a first machine that communicates with a second machine to perform database operations. At least one of the machines is a database server. On the first machine, a first segment of memory is allocated for the second machine. During performance of a database operation that involves the transfer of data from the second machine to the first machine, data is buffered in the first segment of memory. The data is buffered in response to the second machine writing the data to a second segment of memory that is allocated on the second machine for the first machine.

As an example, a database server may allocate a portion of a buffer for a client. The database server may buffer data received from the client in the allocated memory. The data is buffered in response to the client writing the same data to a memory allocated on the client. The transfer of the data is done over a DMA enabled channel. Operations that are performed in conjunction with the transfer of data may be performed in response to structured query language commands sent by the client terminal 110.

In one embodiment, if a DMA transfer is not available between the first and second machines, data is automatically transferred using a TCP/IP transfer protocol. A validation step may be performed to determine whether a DMA channel of a TCP/IP channel should be used to transfer data between the two machines.

In an embodiment, communications described between two machines may be replicated to enable data transfer between additional machines. For example, a client terminal may write data to a database server through a DMA channel, and the database server may distribute the data to other clients through separate DMA channels.

GENERAL FUNCTIONAL DESCRIPTION

FIG. 1 illustrates a basic system for transferring data between two machines, under an embodiment of the invention. A system such as described enables two machines to transfer data and perform database operations with one another using DMA transfer technology. At least one of the to machines includes a database server. In one embodiment, one of the two machines is a client terminal 110, and the other of the two machines is a database server machine 120 that manages a database 132. In other embodiments, client terminal 110 may correspond to another database server machine. For example, a database server component may execute a client process to communicate with database server machine 120.

Client terminal 110 includes a central processing unit (CPU) 112, a memory 114, and an I/O port 118. Database server machine 120 includes a CPU 122, a memory 124, and an I/O port 128. The database 132 on database server machine 120 may be managed by a server component executed by CPU 122.

In one embodiment, client terminal 110 and database server machine 120 may communicate through use of one of two or more channels. A TCP/IP channel 132 and a DMA channel 134 may interconnect the I/O port 118 of client terminal 110 with the I/O port 128 of database server machine 120. The I/O ports 118 and 128 may each include components or features that are configured to communicate with other computers through DMA channel 134. The combination of I/O ports 118, 128 and a fast network connection between client terminal 10 and database server machine 120 may form DMA channel 134. The I/O ports 118, 128 are configured to transfer data from and into allocated segments of memory on their respective machines without use of the CPUs 112, 122. The I/O ports 118, 128 are also configured to communicate with other computers through the use of TCP/IP channel 132 or DMA channel 134. As will be described, embodiments of the invention permit the use of the TCP/IP channel 132 in the event the DMA channel 134 is not available, or becomes disrupted.

In order for the DMA channel 134 to be used, the client terminal allocates a first memory segment 116 of memory 114 for the database server machine 120. The database server machine 120 allocates a second memory segment 126 for the client terminal 110.

The DMA channel 134 may be provided on a different physical component than the TCP/IP channel 132. For example, the DMA channel 134 may include an INFINIBAND connection between client terminal 110 and database server machine 120, while the TCP/IP channel 132 is provided on a traditional network connection, such as an ETHERNET connection. In another embodiment, the DMA channel is provided on the same physical components as the TCP/IP channel 132. Thus, one medium may be capable of use as either a DMA channel or a TCP/IP channel.

In an embodiment, the client terminal 110 and database server machine 120 must determine whether the DMA channel 134 can be used. If DMA channel 134 cannot be used, the TCP/IP channel 132 is used. Preliminary communications to establish and determine whether DMA channel 134 can be used are conducted over the TCP/IP channel.

In one embodiment, client terminal 110 signals a remote procedure call (RPC) to database server machine 120. The CPU 122 of database server machine 120 recognizes that the DMA channel 134 may be available for subsequent communications identified by the RPC. The database server machine 120 signals a return to the RPC through the TCP/IP channel 132, indicating that DMA channel 134 should be used. The CPU 112 of the client terminal 110 then allocates the first segment 116 of memory 114 for the database server machine 120. The CPU 122 of the database server machine 120 allocates the second segment 126 of memory 124 for the client terminal 110. The client terminal 110 sends a bid containing an identifier for first memory segment 116 to the database server machine 120. Similarly, the database server machine 120 sends a bid containing an identifier for second memory segment 126 to the client terminal 110.

Once memory is allocated on client terminal 110 and database server machine 120, an embodiment provides that one or both client terminal 110 and database server 120 perform a verification. The verification is to determine whether the DMA channel is available for data transfer between the two machines. The verification performed on or both machine may be performed through techniques, such as described with FIG. 4.

The DMA channel 134 may be used to perform database operations between client terminal 110 and database server machine 120. Once the DMA channel 134 is established between client terminal 110 and database server machine 120, operations for writing and reading data from one machine to another machine may be executed by the transferor of the data executing a write operation to its memory segment allocated for the other machine. Both read and write operations may be performed by one of the two machines writing data to its allocated local memory, and using the DMA channel 134 to transfer the data from the local memory to the other machine.

For either read or write type operations, if the machines are determined to not be able to communicate over DMA channel 134, then TCP/IP channel 132 will be used. While TCP/IP channel 132 is slower, use of that channel as a backup ensures that the database operations can be performed.

TRANSFERRING DATA TO PERFORM WRITE AND READ OPERATIONS

Figure 2:
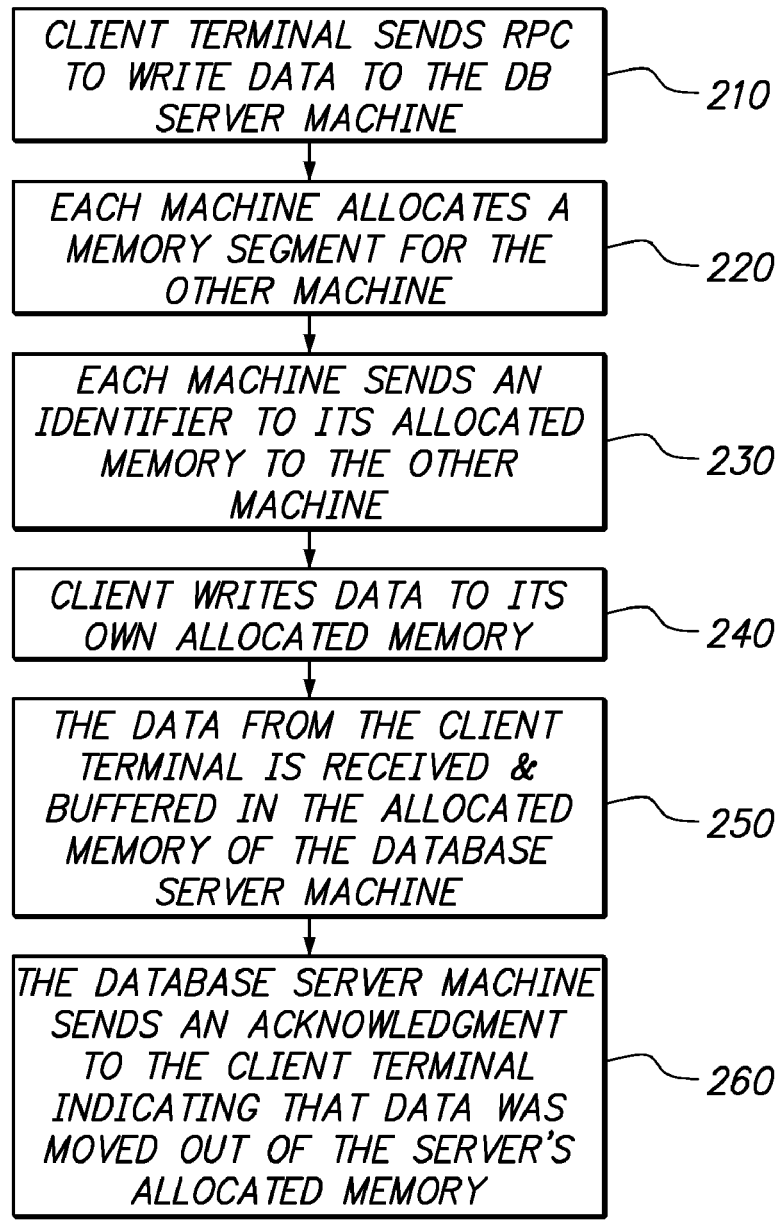
FIG. 2 illustrates a method for implementing write operations between two machines using DMA data transfer, under an embodiment of the invention.
Figure 3:
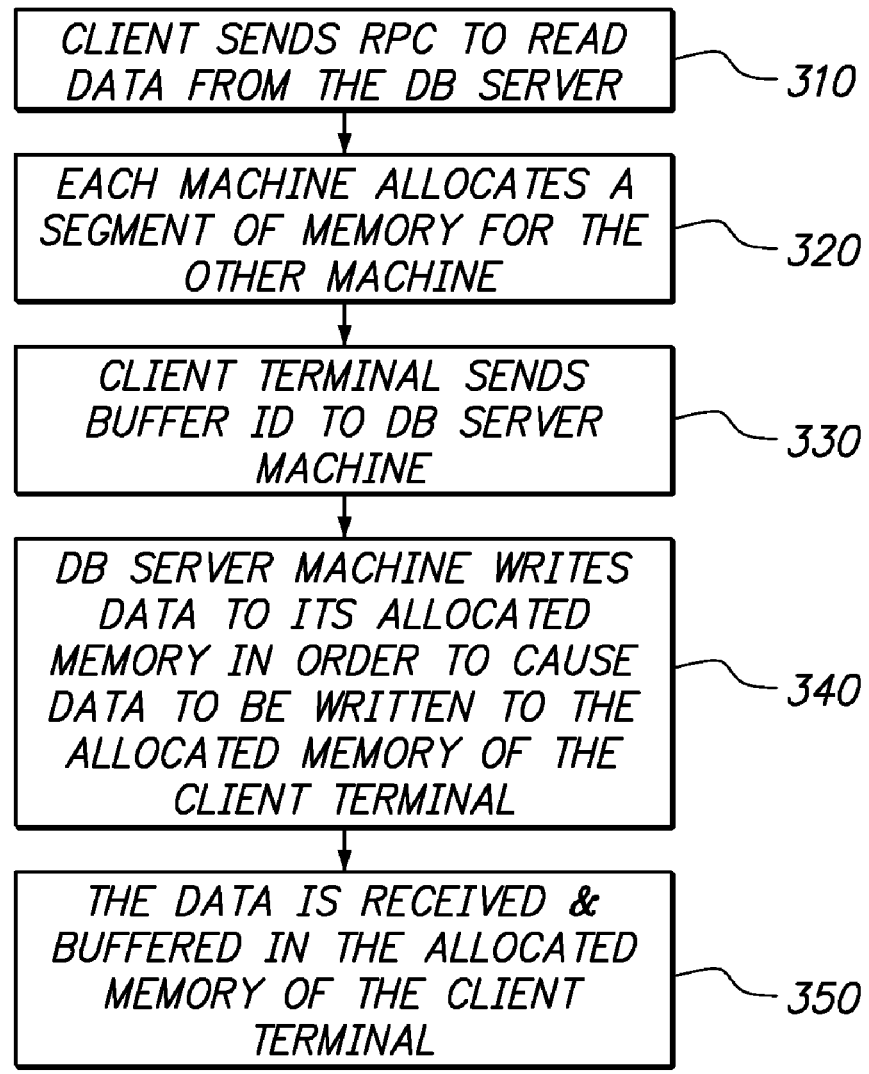
FIG. 3 illustrates a method for implementing read operations between two machines using DMA data transfer, under an embodiment of the invention.

FIG. 2 and FIG. 3 illustrate methods for transferring data between two machines for purpose of performing database operations. The references to elements of FIG. 1 are made for purpose of providing exemplary components for performing the steps of the methods, as described herein.

FIG. 2 illustrates a method for implementing write operations between two machines using DMA data transfer, under an embodiment of the invention. For illustrative purposes, an embodiment is described where client terminal 110 writes data to database server machine 120. For example, client terminal 110 may initiate an INSERT operation to transfer a large amount of data, formatted as rows, to the database on database server machine 120.

In step 210, client terminal 110 sends an RPC to database server machine 120, indicating that client terminal 110 is seeking to write data to the database server machine 120. The RPC may indicate that an INSERT or other write operation is to be performed in order to transfer data to database server machine 120 from client terminal 110. The data may be destined for database 132, or forwarded to other clients and/or database servers. In either case, the database server machine 120 sends a return to the client terminal 110 in response to the remote procedure call being made. Both the remote procedure call and its return are sent through TCP/IP channel 132

After sending the RPC, step 220 provides that each machine allocates a memory segment for the other machine. Thus, client terminal 110 allocates first memory segment 116 for database server machine 120. The database server machine 120 allocates second memory segment 126 for client terminal 110.

Step 230 provides that each machine sends identifiers for its allocated memory to the other machine. Such identifiers may be referred to as bids. The bids contain addresses to the allocated memory on each machine. Thus, client terminal 110 sends a bid to database server machine 120 containing the address to first memory segment 116. Likewise, database server machine 120 sends client terminal 110 the bid containing the address to second memory segment 126. In one embodiment, the bids are also exchanged between client terminal 110 and database server machine 120 through the TCP/IP channel 132.

In order to write data from client terminal 110 to database server machine 120, step 240 provides that client terminal 110 writes the data that is to be transferred to first memory segment 116. The I/O port 118 of client terminal 110 automatically moves the data out of the first memory segment 116 and to database server machine 120, where it is received by the I/O port 128. The data is transferred from client terminal 110 to database server machine 120 using DMA channel 134.

In step 250, data received by database server machine 120 from client terminal 110 is buffered in second memory segment 126. This may be accomplished by the I/O port 128 of database server machine 120 moving the data received from the I/O port 118 into second memory segment 126. The CPU 122 of database server machine 120 then reads the data into the database.

In step 260, the database server machine 120 sends an acknowledgement to client terminal 110 upon the data being moved out of second memory segment 126. For example, CPU 122 may read data from second memory segment 126 and move the data into database 132, or make the data available to other database servers and client terminals. Once second memory segment 126 is empty, the acknowledgement can be made to client terminal 110 so that additional data can be written from client terminal 110 to database server machine 120. In an embodiment, both client terminal 110 and database server machine 120 make acknowledgements when the respective first memory segment 116 and second memory segment 126 are empty.

The acknowledgement may be a relatively short message, such as a few bytes long. Thus, it can be sent over either TCP/IP channel 132 or DMA channel 134. However, once DMA channel 134 is open, it may be easier to send the acknowledgement using the DMA channel 134. Given the small size of the acknowledgement, and the fact that data transmitted over DMA channel 134 contains little overhead (such as in the form of headers), it is also relatively easy to package the acknowledgement with some other message sent from database server machine 120 to client terminal 110.

FIG. 3 illustrates a method for implementing read operations between two machines using DMA data transfer, under an embodiment of the invention. For purpose of illustration, FIG. 3 is described with the read operations being performed from client terminal 110 for data contained in database server machine 120. As an example, an UPDATE or SELECT operation may be performed by client terminal 110 to view data in database 132. The speed in which such operations are performed may be facilitated through the use of DMA channel 134.

In step 310, client terminal 110 sends a remote procedure call to read data from database server machine 120. The remote procedure call may contain or indicate the UPDATE, SELECT or other read operation. A return of the remote procedure call may be made by database server machine 120. Both the remote procedure call and its return are sent through TCP/IP channel 132.

In step 320, each machine allocates a segment of memory for the other machine. As with an embodiment described in FIG. 2, client terminal 110 may allocate first memory segment 116 for database server machine 120. The database server machine 120 may allocate second memory segment 126 for client terminal 110.

Step 330 provides that client terminal 110 sends a bid to database server machine 120 containing the address to first memory segment 116. In an embodiment, database server machine 120 may also send client terminal 110 a bid to the second segment of memory 126 for return communications form client terminal 110. The bids may also be exchanged using the TCP/IP channel 132.

In order to perform the read operation, step 340 provides that database server machine 120 writes data to the second memory segment 126 in order to cause data to be written to first memory segment 116 on client terminal 110. Upon database server machine 120 writing the data to second memory segment 126, I/O port 128 of database server machine 120 moves the data being buffered in second memory segment 126 to the client terminal 110. The data may be moved from client terminal 110 to database server machine 120 across DMA channel 134.

In step 350, the data is received and buffered in the first memory segment 116 of client terminal 110. The I/O port 118 of client terminal 110 moves the data into first memory segment 116. The CPU 112 on client terminal 110 then reads the data requested by the read operation from first memory segment 116.

VALIDATING DMA COMMUNICATIONS

If either of the write or read operations described with FIG. 2 and FIG. 3 are not available between client terminal 110 and database server machine 120, then an embodiment of the invention permits client terminal 110 and database server machine 120 to transfer data for performing the database operations using a TCP/IP channel 132. The use of TCP/IP channel instead of DMA channel 134 provides a reliable backup in the event DMA configurations of client terminal 110 and database server machine 120 are incompatible, or not possible for any reason.

Figure 4:
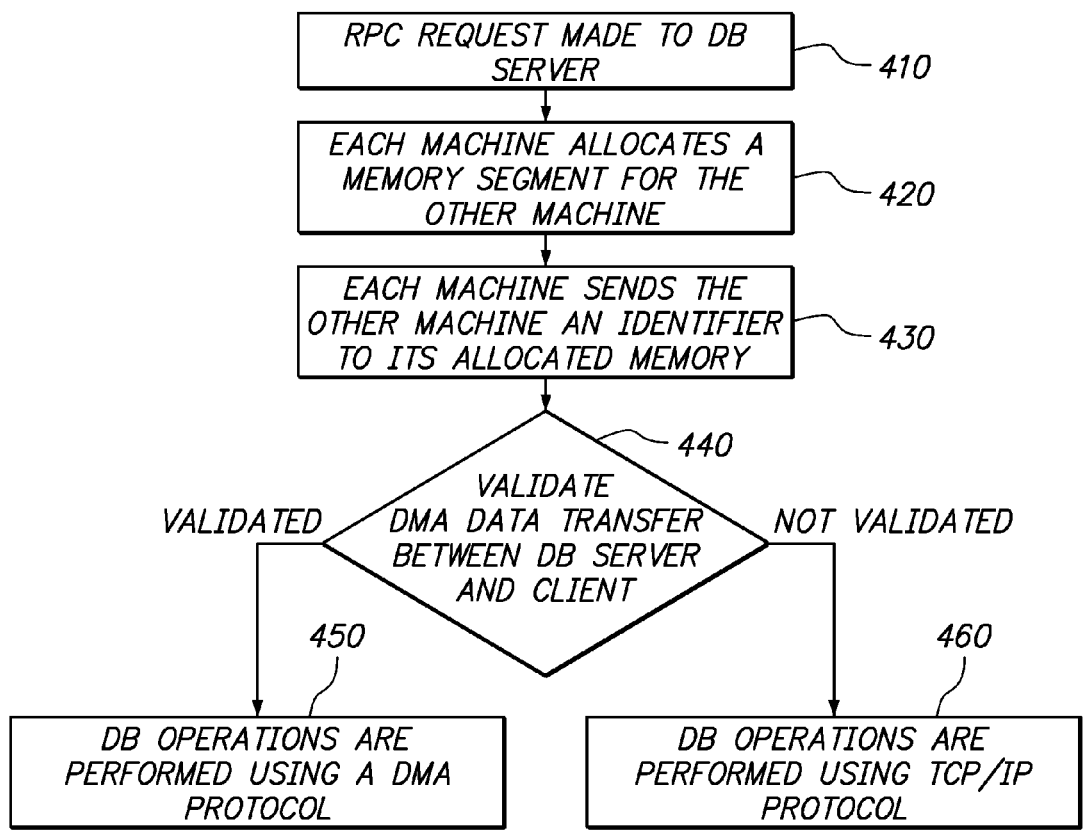
FIG. 4 illustrates a method for validating the ability of two machines to exchange data for database operations using DMA data transfer.

FIG. 4 illustrates a method for validating the ability of two machines to exchange data for database operations using DMA data transfer, under an embodiment of the invention. A method such as described with FIG. 4 may be used in conjunction with transferring data between machines for purpose of performing either write or read operations. Thus, a method such as described with FIG. 4 may be implemented as additional steps to methods described in FIGS. 2 and 3.

In step 410, a first machine sends another machine an RPC to perform some database operation. As stated, the remote procedure call may specify either write or read operations that are to be performed. The other machine may send a return to the RPC. Both the RPC and its return are sent through a TCP/IP channel.

Step 420 provides that each machine allocates a memory segment for the other machine. As described with other embodiments, the allocated memory one each machine provides a temporary buffer for data that is to be transferred amongst the machines.

In step 430, each machine sends the other machine an identifier, or bid, to its allocated memory. The identifier provides an address for one machine to write data to the other machine. The identifiers may be exchanged across a TCP/IP connection.

In step 440, a determination is made to validate that a DMA data transfer can be performed between the two machines. For example, it is possible that the two machines are each DMA enabled, but one machine uses different equipment, software and/or protocol, making the two machines incompatible with one another for purpose of performing DMA data transfers.

Several techniques are possible for making the verification determination. One technique provides that each machine attempts to write data, in the form of a test message, to the other machine using the allocated memories. For example, one machine may write the other machine a test message through its allocated memory, and await for an acknowledgement from the other machine that the data was received, buffered, and/or used by the second machine through the other machine's allocated memory. In one embodiment, only the machine that is to write data to the other machine needs to send the test message. In another embodiment, both machine send each other test messages, and await acknowledgments from the other machine. Both the test message and acknowledgement may be communicated over DMA channel 134.

Another technique provides that the validation is performed by comparing each machine's software to determine whether the machines are compatible for DMA transfer. For example, one machine may send the other machine a message containing its software information, and the other machine may perform the comparison to determine compatibility. In an embodiment, the compatibility information used for performing the verification may be send over a TCP/IP channel. It is possible for the compatibility information to be provided with the remote procedure call and its return. Such a comparison step may be performed in addition to or instead of sending test messages through allocated memory.

If DMA compatibility is validated in step 440, step 450 provides that database operations may be performed between the first machine and the second machine over a DMA connection. If DMA compatibility is not validated in step 440, step 460 provides that database operations may be performed between the first machine and the second machine over a TCP/IP connection. For example, in FIG. 1, DMA channel 134 may be used if the validation is determined in step 440, else TCP/IP channel 132 is used.

USING MULTIPLE BUFFERS TO TRANSFER DATA

Figure 5:
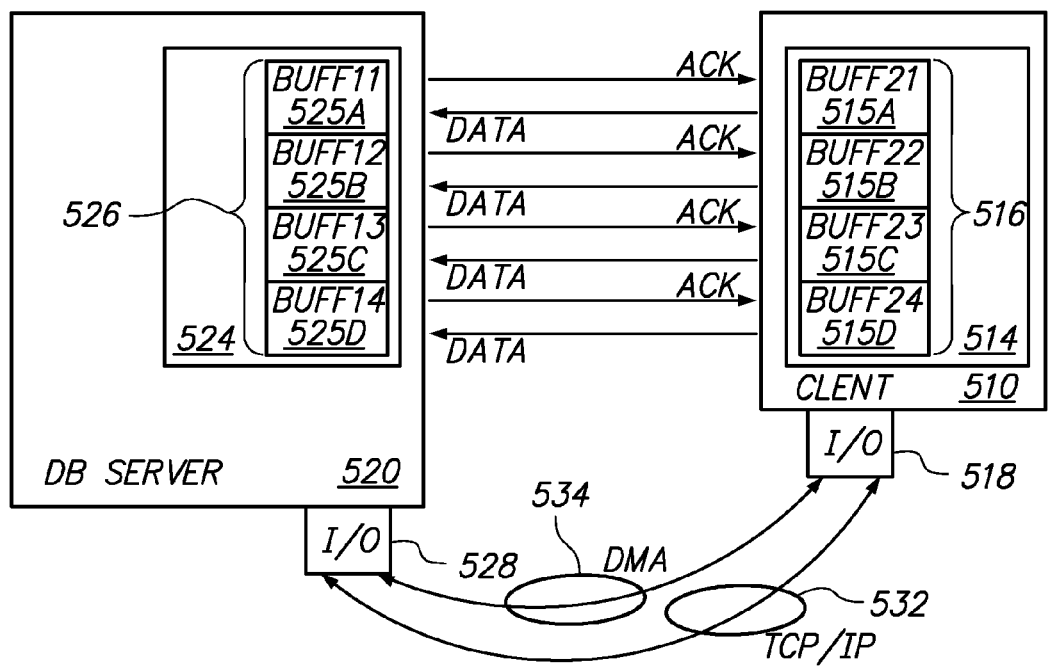
FIG. 5 illustrates a basic system for transferring data between two machines using multiple buffers, under an embodiment of the invention.

FIG. 5 illustrates a basic system for transferring data between two machines using multiple buffers, under an embodiment of the invention. In FIG. 5, a client terminal 510 communicates with a database server machine 520 to perform database operations, including operations to transfer data with read and/or write operations. The client terminal 510 and database server machine 520 are assumed to be compatible across a DMA connection 534. A TCP/IP connection 532 may also interconnect the two machines for purpose of establishing communications across the DMA channel 534. The database server machine 520 manages a database that is not shown in FIG. 5.

The client terminal 510 has a memory 516, a portion of which may be allocated to database server machine 520. Likewise, database server machine 520 has a memory 524, a portion of which may be allocated to client terminal 510. The database server machine 520 also manages a database 532. Communications to and from client terminal 510 may be made through an I/O port 518. Communications to and from database server machine 520 may be made through an I/O port 528.

Upon one of the machines signaling an RPC to the other machine across the TCP/IP connection 532, each machine allocates a portion of its memory for the other machine. The client terminal 510 allocates a first memory segment 516 from its memory 514. The database server machine 520 allocates a second memory segment 526 from its memory 524.

According to an embodiment, the allocated memory on each machine may be divided into a plurality of buffers. On client terminal 510, first memory segment 516 is divided into a first plurality of buffers 515. On database server machine 520, the second memory segment 526 is divided into a second plurality of buffers 525. The relationship between the buffers is that each one of the first plurality of buffers 515 corresponds to one of the second plurality of buffers 525. Thus, if data is written to one of the buffers on either client terminal 510 or database server machine 520, that data is, upon execution of a designated commend automatically written to the corresponding buffer on the other of the two machines. Alternatively, the designated command may be initiated by a prompt from the user, which causes the data to be transferred over the DMA channel 435.

In FIG. 5, the correspondence amongst buffers 515, 525 is illustrated by numbering, where BUFF11 corresponds to BUFF21 and BUFF14 corresponds to BUFF24. The correspondence amongst buffers may be established using the TCP/IP channel 532. For example, the correspondence may be established with the RPC 1 to initiate database operations between client terminal 510 and database server machine 520.

Dividing allocated memory into buffers increases the speed by which data can be moved from client terminal 510 to database server machine 520. If no division is used on the allocated memory, then all data held in first memory segment 516 would have to be transferred to second memory segment 526 before additional data can be exchanged between client terminal 510 and database server machine 520. Therefore, if first memory segment 516 is only 4 k in size, and a user of client terminal 510 wishes to write 8 k of data to database server machine 520, the data would have to be written locally to first memory segment 516 at least twice. First, 4 k would have to be written to first memory segment 516, and once I/O port 518 moves that data to database server machine 520, the next 4 k of data may be written to the first memory segment 516. Even if first memory segment 516 is large enough to accommodate 8 k of data, the 8 k of data would still have to be moved as one chunk, so that some of the data would arrive later than other data.

In contrast, an embodiment such as described in FIG. 5 enables both 4 k segments of data to be transferred from first memory segment 516 concurrently, to enhance the overall delivery time for data to be delivered from client terminal 510 to database server machine 520. The use of buffers reduces the size of the data chunks being sent, so that all the data stored in each buffer 515 can be transferred to corresponding buffers 525 in less time than if the same amount of data was transferred from first memory segment 516 to second memory segment 516 without the use of buffers.

The manner in which client terminal 510 and database server machine 520 may exchange data during performance of database operations is as follows. One machine, the transferor, writes data to its allocated memory, and that data is distributed amongst the buffers. The data is then transported to corresponding buffers on the recipient machine. Once data stored in each buffer on the recipient machine is used, the recipient machine sends the transferor machine an acknowledgement. In an embodiment, the acknowledgement signifies that a buffer on the recipient machine is empty. Thus, an acknowledgement may be sent for each buffer on the recipient machine. Upon receiving the acknowledgement, the transferor machine knows that is can write more data to the buffer corresponding to the recipient machine's buffer from the acknowledgement was received. In an embodiment where asynchronous data transfer is possible, data may be queued in the allocated memory of the machine performing the write operation until buffers become available.

If, as shown by FIG. 5, client terminal 510 is writing data to database server machine 520, then client terminal 510 writes that data locally to first memory segment 516. The data in first memory segment 516 would be distributed to the buffers 515. The I/O port 518 of client terminal 510 moves data from buffers 515 to database server machine 520. The I/O port 528 of database server machine 520 moves the data into buffers 525. In this way, data in one of the buffers 515 of client terminal 510 is moved to its corresponding buffer 525 on database server machine 520. When database server machine 520 uses all of the data being held in one of the buffers 515, the database server machine 520 sends an acknowledgement to the client terminal 510. The client terminal 510 then can place more data into the specific buffer 515 corresponding to the buffer 525 from which the acknowledgement was provided. An acknowledgement may be received from each of the buffers 515. In embodiments where asynchronous data transfer is enabled, client terminal 510 may queue data waiting to be transferred to database server machine 520 until one of the buffers 515 has a corresponding buffer on database server machine 520 that has been acknowledged as being empty.

If, for example, client terminal 510 is performing a read operation for data in the database managed by the database server machine, then the data identified for transfer to client terminal 510 is moved into second memory segment 526. The data may be distributed amongst buffers 515, and carried over to client terminal 510 through I/O port 528. The data may then be held on client terminal 510 in buffers 515. The client terminal 510 then reads data from buffers 515. Once one of the buffers 515 becomes available, client terminal 510 sends an acknowledgement to database server machine 520 indicating that the buffer is empty.

SYNCHRONOUS AND ASYNCHRONOUS DATA TRANSFERS

In a system such as shown by FIG. 5, data may be transferred either synchronously or asynchronously. In synchronous data transfer, if data being written locally to allocated memory for another machine exceeds the size of the allocated memory, then the processor of the machine writing the data remains active to monitor the allocated memory and write additional data to the allocated memory as it becomes available. The data is transferred from the transferor machine as the data is synchronously written to the allocated memory.

In asynchronous transfer, data is written locally on the transferor machine to a queue. The queue causes the data to be written to the buffers as the buffers become available. Active involvement of the processor on the machine writing the data locally is not needed to monitor and write the data to the queue. Rather, all the data that needs to be transferred through the allocated memory is sent once to the queue, and the queue holds the data for the allocated memory (or its individual buffers) until additional data can be distributed within the allocated memory.

HARDWARE OVERVIEW

Figure 6:
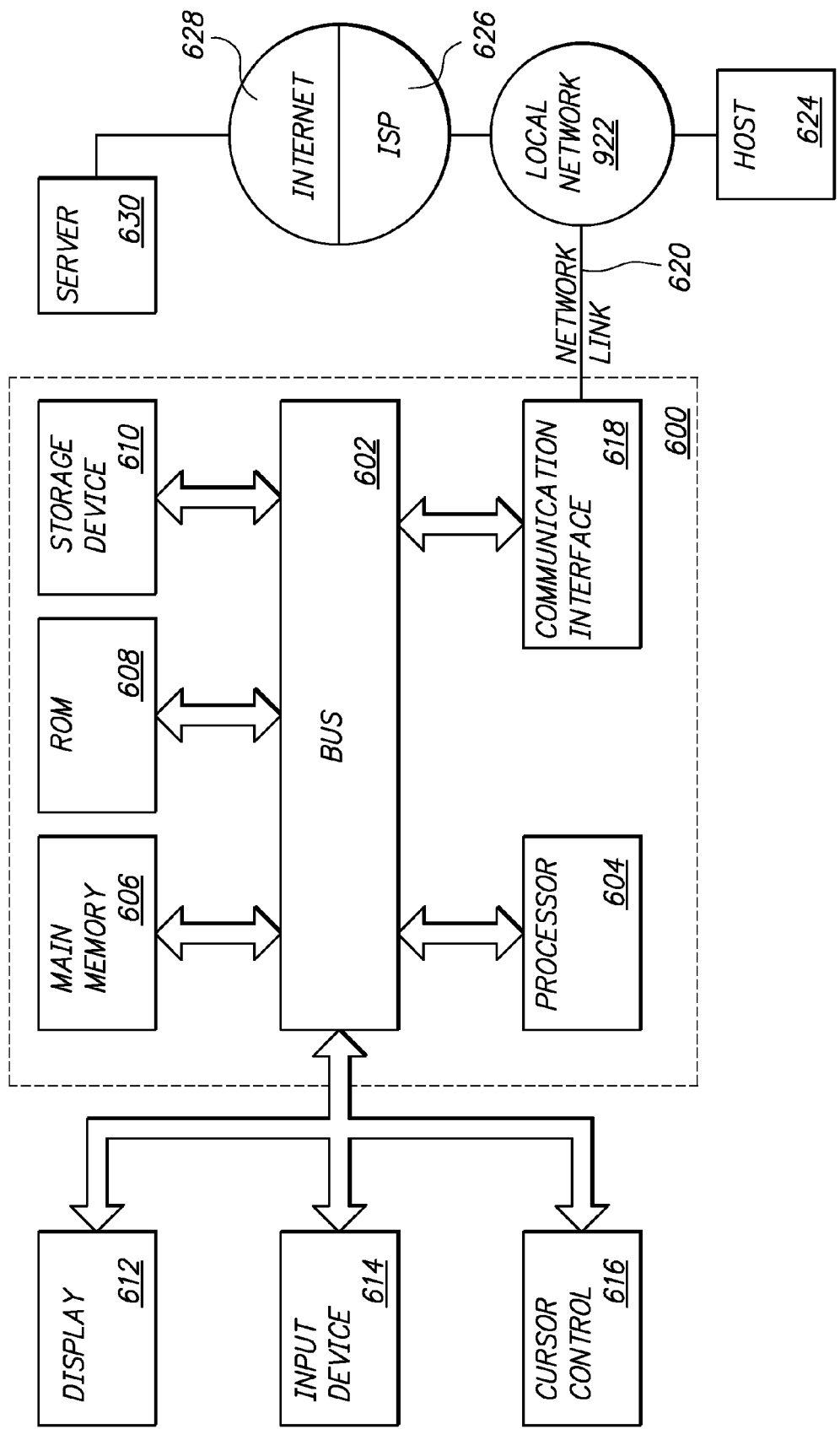
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing database operations, the method comprising performing the following steps on a first machine:
   allocating a first segment of memory for exchanging data with a second machine using the direct memory access enabled channel, wherein at least one of the first machine and the second machine is a database server, wherein allocating the first segment of memory includes identifying a plurality of buffers to be used for exchanging data with the second machine;
   verifying that the first machine and the second machine can communicate using the direct memory access enabled channel;
   in response to determining that the first machine and the second machine can communicate using the direct memory access enabled channel, performing:
      during performance of a database operation that involves a transfer of data from the second machine to the first machine, buffering a portion of said data in the first segment of memory in response to the second machine writing said portion of data to a second segment of memory on the second machine, and
      wherein buffering said portion of said data in the first segment of memory includes (a) buffering said portion of the data received from the second machine in one or more buffers of the plurality of buffers, and (b) sending, to the second machine, an acknowledgment upon each buffer, of the plurality of buffers, becoming available to receive additional data from the second machine; and
   in response to determining that either the first machine or the second machine cannot use the direct memory access enabled channel, using an Internet Protocol enabled channel instead of the direct memory access enabled channel to receive, at said first machine, said data from the second machine to the second machine,
   wherein verifying that the first machine and the second machine can communicate using the direct memory access enabled channel comprises at least one of the following steps:
      sending a test message to the second machine over the direct memory access enabled channel,
      causing the second machine to send a test message to the first machine over the direct memory access enabled channel, and
      comparing information about resources on the second machine for using the direct memory access enabled channel with resources on the first machine for using the direct memory access enabled channel.

2. The method of claim 1, further comprising providing the second machine a first address to the first segment of memory; and
   wherein the step of buffering data in the first segment of memory includes receiving into the first segment of memory data sent by the second machine over said direct memory access enabled channel.

3. The method of claim 2, further comprising during performance of said database operation, a process on said first machine reading said data in the first segment of memory.

4. The method of claim 1, further comprising performing one or more database operations on the first machine while buffering said data, including executing one or more structured query language commands that involve the data received from said second machine in said first segment of memory.

5. The method of claim 1, further comprising receiving a second address from the second machine for the second segment of memory, wherein the second segment of memory is allocated on the second machine for exchanging data with the first machine.

6. The method of claim 5, further comprising sending a request to read said data to the second machine in order to cause the second machine to write said data to said second segment of memory.

7. The method of claim 6, further comprising reading said data from the first segment of memory after buffering said data.

8. The method of claim 6, wherein sending a request to read said data is done over a Transmission Control Protocol/Internet Protocol channel.

9. The method of claim 7, further comprising providing a local notification on the first machine that the first segment of memory is empty as a result of said data being read from the first segment of memory.

10. The method of claim 1, wherein buffering said portion of the data received from the second machine includes concurrently receiving data, from the second machine, into two or more of the plurality of buffers.

11. The method of claim 2, further comprising enabling the second machine to send said data to the first segment of memory asynchronously.

12. The method of claim 2, further comprising enabling the second machine to send said data to the first segment of memory synchronously.

13. The method of claim 1, further comprising sending a remote procedure call to the second machine in order to cause the second machine to write said data to the second segment of the memory.

14. The method of claim 1, wherein sending a remote procedure call includes sending the remote procedure call over a Transmission Control Protocol/Internet Protocol channel.

15. The method of claim 1, wherein responding to a remote procedure call includes receiving the remote procedure call over a Transmission Control Protocol/Internet Protocol channel, and responding to the remote procedure call over the a Transmission Control Protocol/Internet Protocol channel.

16. A method for performing database operations, the method comprising performing the following steps on a first machine:
    allocating a first segment of memory for exchanging data with the second machine using the direct memory access enabled channel, wherein at least one of the first machine and second machine is a database server,
    wherein allocating a first segment of memory includes identifying a first plurality of buffers, wherein each buffer in the first plurality of buffers coffesponds to a buffer in a second plurality of buffers on the second machine;
    verifying that the first machine and a second machine can communicate using a direct memory access enabled channel;
    in response to determining that the first machine and the second machine can communicate using the direct memory access enabled channel, performing:
        during performance of a database operation that involves a transfer of data from the first machine to the second machine, writing a portion of said data to said first segment of memory in order to cause said portion of said data to be buffered in a second segment of memory, wherein the second segment of memory is allocated on the second machine for exchanging data with the first machine,
        wherein writing said portion of said data to said first segment of memory in order to cause said portion of said data to be buffered in a second segment of memory includes using the first plurality of buffers to send said portion of the data to one or more buffers in the second plurality of buffers; and
    in response to determining that either the first machine or the second machine cannot use the direct memory access enabled channel, the first machine sending, to the second machine, said data using an Internet Protocol (IP) enabled channeL
    wherein verifying that the first machine and the second machine can communicate using the direct memory access enabled channel comprises at least one of the following steps:
        sending a test message to the second machine over the direct memory access enabled channel,
        causing the second machine to send a test message to the first machine over the direct memory access enabled channel, and
        comparing information about resources on the second machine for using the direct memory access enabled channel with resources on the first machine for using the direct memory access enabled channel.

17. The method of claim 16, further comprising writing said data to the first segment of memory in order to cause the data to be sent to the second machine using a direct memory access enabled channel.

18. The method of claim 16, wherein writing said data to said first segment of memory includes writing said data to said first segment of memory in order to cause data to be read from the second segment of memory.

19. The method of claim 16, wherein using the first plurality of buffers to send a portion of the data to the one or more buffers of the second plurality of buffers includes:
    using a first buffer in the first plurality of buffers to send a first portion of the data to a colTesponding first buffer in the second plurality of buffers; and
    receiving an acknowledgment from the second machine that the corresponding first buffer in the second plurality of buffers is ready to receive more data.

20. The method of claim 19, wherein in response to receiving the acknowledgment, the method further comprises using the first buffer in the first plurality of buffers to send another portion of the data to the corresponding first buffer in the second plurality of buffers.

21. The method of claim 20, wherein receiving an acknowledgment from the second machine includes receiving the acknowledgment in response to the corresponding first buffer in the second plurality of buffers becoming empty as a result of the second machine using the first portion of the data.

22. The method of claim 17, further comprising:
    if either the first machine or the second machine cannot use the direct memory access enabled channel, then automatically using an Internet Protocol enabled channel instead of the direct memory access enabled channel to send said data from the first machine to the second machine.

23. The method of claim 16, further comprising receiving a remote procedure call from the second machine, and writing said data to said first segment of memory in response to receiving the remote procedure call.

24. The method of claim 23, wherein receiving a remote procedure call from the second machine includes receiving the remote procedure call over a Transmission Control Protocol/Internet Protocol channel.

25. The method of claim 17, wherein writing said data to the first segment of memory in order to cause the data to be sent to the second machine includes asynchronously writing said data to the first segment of memory while causing the data to be sent to the second machine.

26. The method of claim 17, wherein writing said data to the first segment of memory in order to cause the data to be sent to the second machine includes synchronously writing said data to the first segment of memory while causing the data to be sent to the second machine.

27. A method for performing database operations, the method comprising performing the following steps on a first machine:
    allocating a first segment of memory for receiving data from a second machine using the direct memory access enabled channel,
    wherein allocating a first segment of memory includes identifying a plurality of buffers to be used for exchanging data with the second machine;
    verifying that the first machine and the second machine can communicate using a direct memory access enabled channel;
    in response to determining that the first machine and the second machine can communicate using the direct memory access enabled channel, performing:
        during performance of a database operation that involves transfer of data from the second machine to the first machine, receiving in the first segment of memory said data from the second machine over a direct memory access enabled channel, and
        wherein receiving in the first segment of memory said data includes buffering a portion of said data received from the second machine in one or more buffers of the plurality of buffers; and
    in response to determining that either the first machine or the second machine cannot use the direct memory access enabled channel, the first machine receiving, from the second machine, second data, associated with the subsequent database operation, using an Internet Protocol (IP) enabled channel,
    wherein verifying that the first machine and the second machine can communicate using the direct memory access enabled channel comprises at least one of the following steps:
        sending a test message to the second machine over the direct memory access enabled channel,
        causing the second machine to send a test message to the first machine over the direct memory access enabled channel, and
        comparing information about resources on the second machine for using the direct memory access enabled channel with resources on the first machine for using the direct memory access enabled channel.

28. The method of claim 27, further comprising enabling the second machine to send said data by providing the second machine a first address to the first segment of memory.

29. The method of claim 27, further comprising the steps of:
    buffering the data from the second machine; and
    performing one or more database operations on the first machine while buffering said data.

30. The method of claim 28, wherein enabling the second machine to send said data includes enabling the second machine to send the data from a second memory on the second machine that is allocated for the first machine, and where the method further comprises the step of receiving a second address from the second machine for the second segment of memory in order to transfer data from the first machine to the second machine while performing the one or more database operations.

31. The method of claim 27, further comprising the step of providing a local notification on the first machine that the first segment of memory is empty as a result of said data being read from the first segment of memory.

32. The method of claim 28, wherein the step of enabling the second machine to send said data further comprises the step of sending an acknowledgment to the second machine upon the first segment of memory becoming available to receive more data from the second computer.

33. The method of claim 28, wherein the step of enabling the second machine to send said data includes enabling the second machine to send said data to the first segment of memory asynchronously.

34. The method of claim 28, wherein the step of enabling the second machine to send said data includes enabling the second machine to send said data to the first segment of memory synchronously.

35. A computer-readable medium carrying one or more sequences of instructions which, when executed by one or more processors, causes the one or more processors to perform the method recited in claim 1.

36. A computer-readable medium carrying one or more sequences of instructions which, when executed by one or more processors, causes the one or more processors to perform the method recited in claim 2.

37. A computer-readable medium carrying one or more sequences of instructions which, when executed by one or more processors, causes the one or more processors to perform the method recited in claim 3.

38. A computer-readable medium carrying one or more sequences of instructions which, when executed by one or more processors, causes the one or more processors to perform the method recited in claim 4.

39. A computer-readable medium carrying one or more sequences of instructions which, when executed by one or more processors, causes the one or more processors to perform the method recited in claim 5.

40. A computer-readable medium carrying one or more sequences of instructions which, when executed by one or more processors, causes the one or more processors to perform the method recited in claim 6.

41. A computer-readable medium carrying one or more sequences of instructions which, when executed by one or more processors, causes the one or more processors to perform the method recited in claim 7.

42. A computer-readable medium carrying one or more sequences of instructions which, when executed by one or more processors, causes the one or more processors to perform the method recited in claim 8.

43. A computer-readable medium carrying one or more sequences of instructions_which, when executed by one or more processors, causes the one or more processors to perform the method recited in claim 9.

44. A computer-readable medium carrying one or more sequences of instructions which, when executed by one or more processors, causes the one or more processors to perform the method recited in claim 10.

45. A computer-readable medium carrying one or more sequences of instructions which, when executed by one or more processors, causes the one or more processors to perform the method recited in claim 11.

46. A computer-readable medium carrying one or more sequences of instructions which, when executed by one or more processors, causes the one or more processors to perform the method recited in claim 12.

47. A computer-readable medium carrying one or more sequences of instructions which, when executed by one or more processors, causes the one or more processors to perform the method recited in claim 13.

48. A computer-readable medium carrying one or more sequences of instructions which, when executed by one or more processors, causes the one or more processors to perform the method recited in claim 14.

49. A computer-readable medium carrying one or more sequences of instructions which, when executed by one or more processors, causes the one or more processors to perform the method recited in claim 15.

50. A computer-readable medium carrying one or more sequences of instructions which, when executed by one or more processors, causes the one or more processors to perform the method recited in claim 16.

51. A computer-readable medium carrying one or more sequences of instructions which, when executed by one or more processors, causes the one or more processors to perform the method recited in claim 17.

52. A computer-readable medium carrying one or more sequences of instructions which, when executed by one or more processors, causes the one or more processors to perform the method recited in claim 18.

53. A computer-readable medium carrying one or more sequences of instructions which, when executed by one or more processors, causes the one or more processors to perform the method recited in claim 19.

54. A computer-readable medium carrying one or more sequences of instructions which, when executed by one or more processors, causes the one or more processors to perform the method recited in claim 20.

55. A computer-readable medium carrying one or more sequences of instructions which, when executed by one or more processors, causes the one or more processors to perform the method recited in claim 21.

56. A computer-readable medium carrying one or more sequences of instructions which, when executed by one or more processors, causes the one or more processors to perform the method recited in claim 22.

57. A computer-readable medium carrying one or more sequences of instructions which, when executed by one or more processors, causes the one or more processors to perform the method recited in claim 23.

58. A computer-readable medium carrying one or more sequences of instructions which, when executed by one or more processors, causes the one or more processors to perform the method recited in claim 24.

59. A computer-readable medium carrying one or more sequences of instructions which, when executed by one or more processors, causes the one or more processors to perform the method recited in claim 25.

60. A computer-readable medium carrying one or more sequences of instructions which, when executed by one or more processors, causes the one or more processors to perform the method recited in claim 26.

61. A computer-readable medium carrying one or more sequences of instructions which, when executed by one or more processors, causes the one or more processors to perform the method recited in claim 27.

62. A computer-readable medium carrying one or more sequences of instructions which, when executed by one or more processors, causes the one or more processors to perform the method recited in claim 28.

63. A computer-readable medium carrying one or more sequences of instructions which, when executed by one or more processors, causes the one or more processors to perform the method recited in claim 29.

64. A computer-readable medium carrying one or more sequences of instructions which, when executed by one or more processors, causes the one or more processors to perform the method recited in claim 30.

65. A computer-readable medium carrying one or more sequences of instructions which, when executed by one or more processors, causes the one or more processors to perform the method recited in claim 31.

66. A computer-readable medium carrying one or more sequences of instructions which, when executed by one or more processors, causes the one or more processors to perform the method recited in claim 32.

67. A computer-readable medium carrying one or more sequences of instructions which, when executed by one or more processors, causes the one or more processors to perform the method recited in claim 33.

68. A computer-readable medium carrying one or more sequences of instructions which, when executed by one or more processors, causes the one or more processors to perform the method recited in claim 34.

* * * * *

UNITED STATES PATENT AND TRADEMARK OFFICE
CERTIFICATE OF CORRECTION

PATENT NO. : 7,406,481 B2
APPLICATION NO. : 10/323561
DATED : July 29, 2008
INVENTOR(S) : Saha et al.

It is certified that error appears in the above-identified patent and that said Letters Patent is hereby corrected as shown below:

On title page, in Item 75, in column 1, in "Inventors", line 4, delete "Lakshminarayan" and insert -- Lakshminarayanan --, therefor.

On title page, in Item 56, in column 2, under "Other Publications", line 1, delete ""Expriences" and insert -- "Experiences --, therefor.

On page 2, in column 2, under "Other Publications", line 1, delete "Current Claims, PCT/US03/39555, 8 pages.".

In the Drawings

On sheet 5 of 6, in Figure 5, Ref. Numeral 510, line 1, delete "CLENT" and insert -- CLIENT --, therefor.

On sheet 6 of 6, in Figure 6, below Ref. Numeral 626, line 3, below "NETWORK" delete "922" and insert -- 622 --, therefor.

In column 3, line 7, delete "to" and insert -- two --, therefor.

In column 3, line 30, delete "10" and insert -- 110 --, therefor.

In column 4, line 16, delete "or both machine" and insert -- one or both machines --, therefor.

In column 4, line 64, after "132" insert -- . --.

In column 12, line 59, in claim 3, after "comprising" insert -- : --.

In column 13, line 42, in claim 15, after "over" delete "the".

In column 13, line 53, in claim 16, delete "coffesponds" and insert -- corresponds --, therefor.

In column 14, line 14, in claim 16, delete "channeL" and insert -- channel, --, therefor.

CERTIFICATE OF CORRECTION (continued)
U.S. Pat. No. 7,406,481 B2

In column 14, line 40, in claim 19, delete "colTesponding" and insert -- corresponding --, therefor.

In column 16, line 57, in claim 43, delete "instructions_which," and insert -- instructions which, --, therefor.

Signed and Sealed this

Sixth Day of April, 2010

David J. Kappos
*Director of the United States Patent and Trademark Office*